(12) United States Patent
Trubiano et al.

(10) Patent No.: US 8,110,221 B2
(45) Date of Patent: Feb. 7, 2012

(54) ENCAPSULATION OF OXYGEN SENSITIVE AGENTS WITH SOY PROTEIN OR CASEIN AND A MODIFIED STARCH

(75) Inventors: Paolo C. Trubiano, Somerville, NJ (US); Afaf G. Makarious, East Brunswick, NJ (US)

(73) Assignee: Brunob II B.V., Arnhem (NL)

( * ) Notice: Subject to any disclaimer, the term of this patent is extended or adjusted under 35 U.S.C. 154(b) by 566 days.

(21) Appl. No.: 11/731,411

(22) Filed: Mar. 30, 2007

(65) Prior Publication Data
US 2007/0172513 A1 Jul. 26, 2007

Related U.S. Application Data

(62) Division of application No. 10/826,218, filed on Apr. 15, 2004, now abandoned.

(51) Int. Cl.
*A61K 9/14* (2006.01)
*C08B 31/00* (2006.01)
*A23L 1/05* (2006.01)
*A23B 7/154* (2006.01)

(52) U.S. Cl. ......... 424/488; 536/102; 426/321; 426/661

(58) Field of Classification Search .................. None
See application file for complete search history.

(56) References Cited

U.S. PATENT DOCUMENTS

| | | |
|---|---|---|
| 4,460,617 A | 7/1984 | Barndt et al. |
| 4,971,723 A | 11/1990 | Chiu |
| 5,143,737 A | 9/1992 | Richardson |
| 5,601,760 A | 2/1997 | Rosenberg |
| 5,935,826 A | 8/1999 | Blue et al. |
| 6,086,917 A | 7/2000 | Trubiano et al. |
| 6,500,463 B1 | 12/2002 | van Lengerich |
| 6,608,017 B1 | 8/2003 | Dihora et al. |
| 6,723,358 B1 | 4/2004 | van Lengerich |
| 2003/0032562 A1 | 2/2003 | Crossman et al. |
| 2003/0185960 A1 | 10/2003 | Augustin et al. |
| 2006/0068019 A1 | 3/2006 | Dalziel et al. |

FOREIGN PATENT DOCUMENTS

| | | |
|---|---|---|
| CN | 1345588 | 4/2002 |
| EP | 0922449 | 6/1999 |

OTHER PUBLICATIONS

Sheu et al., "Microencapsulation by spray drying ethyl caprylate in whey protein and carbohydrate wall systems", J. Food Science 60 (1) : 98-103 (1995).*
Rovesti, "Hdrodispersible natural colour extracted by means of orange oil from citrus wast materials", Rivista Italiana Essenze, Profumi, Piante Officinali, Aromi, Saponi, Cosmetici, Aerosol 60 (2) : 66-68 (1978).*
Kim et al., "Microencapsulation Properties of Gum Arabic and Several Food Proteins: Spray-Dried Organge Oil Emulsion Particles", J. Agric. Food Chem. 44 : 1314-1320 (1996).*
Wu, Xiangming, et al., "Studies on modified soybean protein's funtionalities and its application", Journal of Zhejiang University of Technology 28(3): 256-259, Sep. 30, 2000.
Huang, Qiang, et al., "The production of starch modified by alkenyl succinic anhydrides and its use in food industry", Journal of Cereals & Oils, 5:28-30, Dec. 31, 2000.

* cited by examiner

*Primary Examiner* — Sandy Saucier
(74) *Attorney, Agent, or Firm* — Karen G. Kaiser

(57) ABSTRACT

The present invention relates to the use of a mixture of modified starch and protein for encapsulating oxygen sensitive agents, wherein the modified starch is a starch derivative containing a hydrophobic group or both a hydrophobic and a hydrophilic group which has been further enzymatically hydrolyzed by an exo-enzyme. The encapsulated materials have a high level of active agent and retention and provide excellent oxidation resistance. Further, the encapsulated materials are useful in a variety of products, including food products.

8 Claims, No Drawings

ENCAPSULATION OF OXYGEN SENSITIVE AGENTS WITH SOY PROTEIN OR CASEIN AND A MODIFIED STARCH

This application is a divisional application of U.S. Ser. No. 10/826,218 filed Apr. 15, 2004 now abandoned and claims priority thereto.

BACKGROUND OF THE INVENTION

The present invention relates to the use of a mixture of modified starch and either casein and/or soy protein for encapsulating oxygen sensitive agents, wherein the modified starch is a starch derivative containing a hydrophobic group or both a hydrophobic and a hydrophilic group which has been further enzymatically hydrolyzed by an exo-enzyme. The present invention also relates to the resultant encapsulated material and its use in a variety of products.

SUMMARY OF THE INVENTION

The present invention relates to the use of a mixture of modified starch and casein and/or soy protein (hereinafter protein) for encapsulating oxygen sensitive agents, wherein the modified starch is a starch derivative containing a hydrophobic group or both a hydrophobic and a hydrophilic group which has been further enzymatically hydrolyzed by an exo-enzyme. The encapsulated materials have a high level of active agent and retention while providing excellent oxidation resistance. Further, the encapsulated materials are useful in a variety of products, including food products.

As used herein, the term exo-enzyme is intended to mean an enzyme capable of cleaving the 1,4-linkages of the starch molecule from the non-reducing ends to produce mono- and/or di-saccharides. The enzyme may also be capable of cleaving the 1,6-linkages, but this is an optional capability.

As used herein, oxygen sensitive agent is intended to mean one which is susceptible to oxygen.

As used herein, dextrose equivalent (DE) is defined as the reducing power of the hydrolyzate. Each starch molecule has one reducing end: therefore DE is inversely related to molecular weight. The DE of anhydrous D-glucose is defined as 100 and the DE of unhydrolyzed starch is virtually zero.

As used herein, water fluidity (WF) is intended to mean a starch measurement using a Thomas Rotational Shear-type Viscometer (commercially available from Arthur A. Thomas CO., Philadelphia, Pa.), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion: as conversion increases, the viscosity decreases.

As used herein, funnel viscosity is intended to mean viscosity as measured using the following procedure. The starch dispersion to be tested is adjusted to between 19% and 25% (w/w) measured by refractometer. The temperature of the dispersion is controlled at 22° C. A total of 100 ml of the starch dispersion is measured into a graduated cylinder. It is then poured into a calibrated funnel while using a finger to close the orifice. A small amount is allowed to flow into the graduate to remove any trapped air and the balance is poured back into the funnel. The graduated cylinder is then inverted over the funnel so that the contents draw (flow) into the funnel while the sample is running. Using a timer, the time required for the 100 ml sample to flow through the apex of the funnel is recorded. The glass portion of the funnel is a standard 58°, thick-wall, resistance glass funnel whose top diameter is about 9 to about 10 cm with the inside diameter of the stem being about 0.381 cm. The glass stem of the funnel is cut to an approximate length of 2.86 cm from the apex, carefully fire-polished, and refitted with a long stainless steel tip with is about 5.08 cm long with an outside diameter of about 0.9525 cm. The interior diameter of the steel tip is about 0.5952 cm at the upper end where is attached to the glass stem and about 0.4445 cm at the outflow end with the restriction in the width occurring at about 2.54 cm from the ends. The steel tip is attached to the glass funnel by means of a Teflon tube. The funnel is calibrated so as to allow 100 ml of water to go through in six seconds using the above procedure.

DETAILED DESCRIPTION OF THE INVENTION

The present invention relates to the use of a mixture of modified starch and protein for encapsulating oxygen sensitive agents, wherein the modified starch is a starch derivative containing a hydrophobic group or both a hydrophobic and a hydrophilic group which has been further enzymatically hydrolyzed by an exo-enzyme. The encapsulated materials have a high level of active agent and retention and provide excellent oxidation resistance. Such encapsulating agents can be processed at high solids during the encapsulation process. Further, the encapsulated materials are useful in a variety of products, including food products.

All starches and flours (hereinafter starch) are suitable for use herein and may be derived from any native source. A native starch, as used herein, is one as it is found in nature, including those developed by plant breeding, and bioengineered starches. Typical sources for the starches are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch containing at least about 95% by weight amylopectin and the term "high amylose" is intended to include a starch containing at least about 45% by weight amylose. In one embodiment, the starch base is selected from the group consisting of corn, waxy maize, tapioca, potato, and rice starch.

Also included as useful base starch materials are the conversion products derived from any of the above starches including fluidity or thin-boiling starches prepared by oxidation, α-amylase conversion, mild acid hydrolysis or heat dextrinization, and derivatized starch such as ethers and esters.

In one embodiment, the base is a pregelatinized starch. Pregelatinization and techniques for achieving pregelatinization are known in the art and disclosed for example in U.S. Pat. Nos. 4,465,702, 5,037,929, 5,131,953, and 5,149,799. Also see, Chapter XXII—"Production and Use of Pregelatinized Starch" *Starch: Chemistry and Technology*, Vol. III—Industrial Aspects, R. L. Whistler and E. F. Paschall, Editors, Academic Press, New York 1967. The term pregelatinized is intended to mean swollen starch particles, which have lost their birefringence and/or Maltese crosses in polarized light. Such pregelatinized starches derivatives are substantially soluble in cold water without cooking. In this context "soluble" does not necessarily mean the formation of a true molecular solution, but may also mean a colloidal dispersion. In one embodiment, the starch is completely pregelatinized.

In one embodiment, the starch base or pregelatinized starch base is a fluidity starch converted by mild acid degradation or heat dextrinization methods that are well known in the art. For example, see Rutenberg, "Starch and Its Modifications," *Handbook of Water-Soluble Gums and Resins*, Davidson, Editor, McGraw-Hill, Inc., New York, N.Y., 1980, pp. 22-36. A combination of one or more of these conversion techniques may be used. The conversion is typically carried out before treatment with a hydrophobic or a hydrophobic/hydrophilic reagent and before the enzyme treatment. If desired, the starch base may be converted by treatment with an α-amylase enzyme to produce a fluidity starch in the manner disclosed in U.S. Pat. No. 4,035,235. Such conversion is not typically used if a high viscosity system is desired.

The starch may be derivatized by treatment with any reagent or combination of reagents which contributes encapsulating properties to the starch. The reagent must contain a hydrophobic moiety and may contain a hydrophilic moiety. The hydrophobic moiety may be an alkyl or an alkenyl group which contains at least five carbon atoms or an aralkyl or aralkenyl group which contains at least six carbon atoms, and in one embodiment up to about twenty-four carbon atoms. The hydrophilic moiety may be contributed by the reagent or the starch's own hydroxyl groups may serve as the hydrophilic moiety and the reagent may contribute only the hydrophobic moiety.

Any process for derivatizing starch which yields the desired blend of hydrophobic or hydrophobic and hydrophilic functions on the starch molecule and thereby yields stable encapsulation properties may be used to prepare the modified starch of the present invention. Suitable derivatives and methods for producing them are known in the art and disclosed in U.S. Pat. No. 4,626,288 which is incorporated herein by reference. In one embodiment, the starch is derivatized by reaction with an alkenyl cyclic dicarboxylic acid anhydride by the method disclosed in U.S. Pat. Nos. 2,613,206 and 2,661,349, incorporated herein by reference. In another embodiment, the starch is derivatized by reaction with octenylsuccinic anhydride or with dodecenylsuccinic anhydride.

Where a low viscosity is desirable, one embodiment uses an octenyl succinic half ester derivative of an amylopectin containing starch, which has been converted to a water fluidity (WF) of up to about 60. In another embodiment, such converted OSA starch is a waxy corn starch. Water fluidity is an empirical test of viscosity measured on a scale of 0-90 wherein fluidity is the reciprocal of viscosity. In yet another embodiment, the converted starch is treated with at from about 0.1% to about 3.0% for food products and at least about 0.1% for other products, of the octenyl succinic anhydride. In the alternative, a hydroxypropyl octenyl succinic derivative may be used.

After derivatizing the starch, it is further enzymatically hydrolyzed by at least one exo-enzyme capable of cleaving the 1,4-linkages of the starch molecule from the non-reducing ends, while maintaining substantially high molecular weight portions of the starch base. The enzymes useful in the present invention thus include, but are not limited to, β-amylase, glucoamylase, maltogenase, pullulanase, exo-alpha-1,4-glucosidase, exo-1,4-alpha-D-glucan maltotetrahydrolase, and exo-1,4-alpha-D glucan maltohexahydrolase. In one embodiment, the enzyme is chosen from the group consisting of β-amylase and glucoamylase. In another embodiment, the enzyme is not capable of substantially cleaving the 1,6-linkages of the starch molecule.

The enzymatic hydrolysis of the starch base is carried out using techniques known in the art. The amount of enzyme used is dependent upon the enzyme source and activity, base material used, and the amount of hydrolysis desired. In one embodiment, the enzyme is used in an amount of from about 0.01 to about 1.0%, in a second embodiment from about 0.01 to 0.3%, by weight of the starch.

The optimum parameters for enzyme activity will vary depending upon the enzyme used. The rate of enzyme degradation depends upon factors known in the art, including the enzyme concentration, substrate concentration, pH, temperature, the presence or absence of inhibitors, and the degree and type of modification. These parameters may be adjusted to optimize the digestion rate of the starch base.

The starch may be pregelatinized before hydrolysis, and may need to be pregelatinized if using an enzyme that cannot hydrolyze granular starch to the degree desired. The gelatinization process unfolds the starch molecules from the granular structure, thereby permitting the enzyme to more easily and uniformly degrade the starch molecules.

Generally the enzyme treatment is carried out in an aqueous or buffered slurry at a starch solids level of about 10 to about 40%, depending upon the base starch being treated. A solids level of from about 15 to 35% is useful in one embodiment, from about 18 to 25% useful in another embodiment, of the instant invention. In the alternative, the process may utilize an enzyme immobilized on a solid support.

Typically, enzyme digestion is carried out at the highest solids content feasible without reducing reaction rates in order to facilitate any desired subsequent drying of the starch composition. Reaction rates may be reduced by high solids content as agitation becomes difficult or ineffective and the starch dispersion becomes more difficult to handle.

The pH and temperature of the slurry should be adjusted to provide effective enzyme hydrolysis. These parameters are dependent upon the enzyme to be used and are known in the art. In one embodiment a temperature of about 22 to about 65° C. is used; in another from about 50 to about 62° C. In one embodiment, the pH is adjusted to about 3.5 to about 7.5; in another from about 4.0 to about 6.0, using techniques known in the art.

The enzyme reaction is continued until the desired end point (i.e., sufficient degradation to provide the desired functionality for the particular application) has been reached. In one embodiment, the enzyme reaction is continued until a dextrose equivalent of at least about 20 and up to about 80 is reached; in another until a dextrose equivalent of from about 30 to about 50 has been reached. The end point may be determined by a change in viscosity, by reducing sugar content (such as measured by dextrose equivalents), or by any other method known in the art for measuring the level of enzyme degradation of the starch molecule. In general, the enzyme reaction will take from about 0.1 to about 24 hours and in one embodiment will take from about 0.5 to about 4 hours. The time of the reaction is dependent upon the type of starch used, the amount of enzyme used, and the reaction parameters of solids percent, pH, and temperature.

The enzyme degradation is then terminated by any technique known in the art such as acid or base deactivation, heat deactivation, ion exchange, and solvent extraction. For example, acid deactivation may be accomplished by adjusting the pH to lower than 2.0 for at least 30 minutes or heat deactivation may be accomplished by raising the temperature to about 85 to about 95° C. and maintaining it at that temperature for at least about 10 minutes to fully deactivate the enzyme. Heat deactivation is not suitable if a granular product is desired as the heat necessary to deactivate the enzyme will generally also gelatinize the starch.

The resultant solution is typically adjusted to the desired pH according to its intended end use. In general, the pH is adjusted to from about 5.0 to about 7.5, and in one embodiment from about 6.0 to about 7.0, using techniques known in the art.

The resulting starch is characterized by a relatively low viscosity, moderately high dextrose equivalent, neutral taste, and by its unique functionality as an encapsulating agent.

The viscosity of the resultant starch should be less than about 30 seconds and in one embodiment is from about 8 to about 25 seconds, each as measured by the funnel method. In another embodiment, the viscosity of the starch is from about 8 to about 15 seconds as measured by the funnel method. Viscosity is an important parameter in contributing to efficient encapsulation.

The resultant starch should have a dextrose equivalent of at least about 20 and up to about 80. In one embodiment, the dextrose equivalence is from about 30 to about 50.

The resultant starch should have a percent sugars of at least about 20% and up to about 80%. In one embodiment, the percent sugars, is from about 30 to about 40% glucose and in another from about 30 to about 35% glucose.

The encapsulating material also contains protein, by which is meant casein and/or soy protein. Casein is intended to include salts thereof. Soy protein is intended to include soy protein concentrate and soy protein isolate. In one embodiment, sodium caseinate is used. In another embodiment, soy protein isolate is used. The ratio of starch to protein is in an amount of from about 30:70 to 90:10. In another embodiment, the ratio of starch to protein is in an amount of from about 40:60 to 80:20.

The protein may be added to the starch dispersion/solution and used as a liquid. In another embodiment, the starch/protein dispersion/solution may be concentrated prior to usage. In yet another embodiment, the starch/protein dispersion/solution may be dried using any method known in the art and stored until use. In an alternate method, the dry protein is added to the dried starch. In one embodiment, drying of the individual components or the starch/protein mixture is conducted by a method selected from the group consisting of drum drying, spray drying or freeze drying.

Except for the drying step, the protein/starch mixture may be prepared at temperatures below those at which a Maillard reaction occurs. In one embodiment, the mixture is prepared at room temperature (about 22° C.). In another embodiment, at a temperature below 55° C., in yet another below 40° C. and in still yet another below 30° C.

The starch/protein encapsulating agent may be used to encapsulate any active agent and in one embodiment is used to encapsulate an oxygen sensitive agent. Oxygen sensitive agents are intended to include, without limitation, unsaturated fatty acids such as gamma-linolenic acids, citrus oils such as orange oils, vitamins such as Vitamin A, Vitamin E, Vitamin C, and Vitamin D, tocopherols, tocotrienols, phytosterols, Vitamin K, beta-carotene, marine oils, and omega-3 fatty acids. In a further embodiment, the starch/protein encapsulating agent is used to encapsulate marine oil or omega-3 fatty acids, including concentrated omega-3 fatty acids.

The active agent may be any substance which will not react with the starch/protein system, including but not limited to oils, fats, flavors, colors, fragrances, vitamins, and pharmaceuticals. In particular, the starch/protein of the present invention is useful for emulsifying or encapsulating oil-based active agents. These oils may be volatile or non-volatile and are generally characterized by being water immiscible but dispersible (emulsifiable) in water in the presence of an encapsulating agent.

The active agents may be encapsulated using the starch/protein encapsulating agents of the present invention and techniques known in the art. In one embodiment, the starch/protein encapsulating agent may be dispersed in water, the active agent may be added and emulsified, and the emulsion may then be dried to form the encapsulated material. Drying may be accomplished by any appropriate method known in the art, including but not limited to spray drying, extrusion, spray chilling, and fluid bed coating. In one embodiment, the active agent is homogenized (emulsified) in a solution/dispersion of the starch/protein mixture and then spray dried. Emulsification and drying conditions may be controlled by one skilled in the art to yield encapsulated material with the desired attributes. For example, if volatile or heat labile active agents are used, relatively low temperatures will be used to reduce loss and/or inactivation of the active agent. One skilled in the art may also vary the average particle size of the emulsion to obtain the desired results. In one embodiment, the particle size of the emulsion is about one micron.

The resultant encapsulated materials are in the form of a dry, free-flowing powder. These materials have the advantage of achieving and maintaining consistently high active agent levels, and/or excellent oxidation resistance.

The encapsulated material prepared with the present encapsulating agents consistently achieves and maintain a relatively high level of the active agent. The active agent may be present in an amount of from about 5 to 70% (wt/wt) based upon the encapsulated material (starch/protein plus active agent). In another embodiment, the active agent is present in an amount of from about 15 to 60% (wt/wt).

A high level of active agent is desirable to reduce the cost of producing the final product as encapsulating agents are often expensive. Further, some encapsulating agents may contribute adverse or undesirable properties to the final system and it is thus desirable to reduce the amount of encapsulating agent used.

It is important not only to achieve a high level of active agent, but also to maintain it so as to enable a longer shelf life. The present encapsulating agents also retain the oil so as to provide a low surface oil. This is particularly true when glucoamylase is used to enzymatically hydrolyze the starch. The surface oil may be measured by methods known in the art such as by washing the encapsulated powder with a suitable solvent. Reduction of surface oil is important as increased surface oil indicates that the load of the active agent is not being maintained and inefficiency of encapsulation. Thus, reduction of surface oil results in a longer shelf life.

The present encapsulating agents also provide a relatively high level of oxidation resistance, thereby prolonging storage stability of the encapsulated material and shelf life of the final product. Oxidation resistance may be measured by methods known in the art. Oxidation resistance is important not only for flavor considerations of the oil, but also to maintain the activity of various materials. To further increase oxidation resistance, an anti-oxidant and/or reducing agent may be added to the oil.

The encapsulated material is stable when stored as a powder and releases the active agent upon exposure to moisture. The resultant encapsulated material may be used at any level desired, the amount being dependent upon the amount of active agent to be incorporated and the product in which it is to be used. In one embodiment in which the encapsulated materials are used in a food product, the encapsulated material is used in an amount of from about 0.01 to about 10% by weight of the food product and in another embodiment up to about 5% (wt/wt).

The resultant encapsulated material may be used in various food products including, but not limited to, cereals; powdered drink mixes; instant coffees and teas; powdered sauce and gravy mixes; instant soups; powdered dressings; bakery products including breads and bread products; intermediate moisture foods including shelf stable nutrition bars; flavors; fragrances; colorants; and other dry food products. Upon preparation of powdered and instant products, the moisture triggers the release mechanism, providing the active agent to the consumer.

The resultant encapsulated material may also be used in a variety of pharmaceuticals including vitamins; personal care products including antiperspirants, deodorants, soaps, fragrances, and cosmetics; hair care products, such as hair sprays, mousses, shampoos, cream rinses, and gels; paper products such as diapers, sanitary napkins, paper towels, tissues, toilet tissues; animal care products such as kitty litter; and household products such as carpet cleaners, and air fresheners.

EXAMPLES

The following examples are presented to further illustrate and explain the present invention and should not be taken as limiting in any regard. All percents are on a weight/weight basis unless otherwise stated. Room temperature was approximately 22° C.

The following analytical tests were used to measure various parameters in the examples.

Determination of Dextrose Equivalents (DE)

The dextrose equivalent of starch may be determined by using the Reducing Sugars test described in Food Chemicals Codex, 4th ed., Jul. 1, 1996. Section 5, General Tests and Assays, Appendix X: Carbohydrates (Starches, Sugars, and Related Substances) or Standard Analytical Method #E-26 for Dextrose Equivalent from the Corn Refiners Association.

Oxidation Resistance Analysis p-Anisidine Value (AOCS Official Method Cd 18-90, 1997), peroxide value (AOCS Official Method Cd 8-53, 1997), fatty acids profile (AOAC 996.06, 2000, modified) were tested to establish compliance with the current quality standards for EPA and DHA.

Oil Retention (Loading) Analysis

To determine the oil retention of the encapsulated material, 15 grams of the spray dried, encapsulated oil and 150 ml distilled water are mixed to reconstitute the emulsion. The emulsion is heated to reflux and held for four hours. The mixture is then cooled and the separated oil is removed and weighed.

$$\% \text{ Retention} = \frac{\text{volume of oil extracted} \times \text{specific gravity of oil}}{\text{Theoretical oil weight}} \times 100$$

Example 1

Preparation of the Derivatized Starch (a) Using OSA 500 grams of waxy maize starch were slurried in 750 ml water. The pH was adjusted to 7.5 using 3% sodium hydroxide. 15 grams of octenylsuccinic anhydride (OSA) were added in one-third increments every thirty minutes while maintaining the pH at 7.5 using 3% sodium hydroxide with constant agitation. The starch was then filtered out and washed with 750 ml water. The starch was then reslurried in 500 ml water and the pH adjusted to 5.5 with 3:1 hydrochloric acid. The starch was then filtered, washed with 750 ml water, and air dried to produce an OSA starch.

(b) Using DDSA

Example 1(a) was repeated using dodecenylsuccinic anhydride (DDSA) in place of OSA.

Example 2

Preparation of the Modified Starch a. Using Glucoamylase 100 grams of the OSA starch of Example 1 were slurried in 300 ml water and the pH adjusted to 5.5 using dilute hydrochloric acid. The slurry was gelatinized by jet cooking in a C1-339 jet cooker, commercially available from National Starch and Chemical Company, at 300° F. (149° C.), at a chamber pressure of 55 psi (379.2 kPa), and a slurry rate of 6 ml/min with the steam valve open at 75% capacity.

The temperature of the starch solution was then decreased to 55° C. 0.05% glucoamylase (AMG 200 L, commercially available from Novo Nordisk) based on the weight of the starch was added and the reaction was allowed to proceed at 55° C. with constant mixing for approximately 2.5 hours until a dextrose equivalent of 36 and a viscosity of 17 sec at 25% solids and 22° C. using the funnel method. The enzyme was then deactivated by heating the dispersion to 90° C. and maintaining the elevated temperature for 30 minutes. The dispersion was then cooled to room temperature and spray dried using an inlet temperature of 200° C., an outlet temperature of 100° C. and a feed rate of 65 ml/min.

b. Using β-amylase 100 grams of the OSA starch of Example 1 were slurried in 300 ml water and the pH adjusted to 5.5 using dilute hydrochloric acid. The slurry was gelatinized by jet cooking in a C1-339 jet cooker, commercially available from National Starch and Chemical Company, at 300° F. (149° C.), at a chamber pressure of 55 psi (379.2 kPa), and a slurry rate of 6 ml/min with the steam valve open at 75% capacity.

The temperature of the starch solution was then decreased to 55° C. 0.2% β-amylase (Spezyme BBA 1500, commercially available from Genencor) based on the weight of the starch was added and the reaction was allowed to proceed at 55° C. with constant mixing for approximately 4 hours until a dextrose equivalent of 36 and a viscosity of 17 sec at 25% solids and 22° C. using the funnel method. The enzyme was then deactivated by heating the dispersion to 90° C. and maintaining the elevated temperature for 30 minutes. The dispersion was then cooled to room temperature and spray dried using an inlet temperature of 200° C., an outlet temperature of 100° C. and a feed rate of 65 ml/min.

c. Using a Combination of β-amylase and Pullulanase 100 grams of the OSA starch of Example 1 were slurried in 300 ml water and the pH adjusted to 5.25 using dilute hydrochloric acid. The slurry was gelatinized by jet cooking in a C1-339 jet cooker, commercially available from National Starch and Chemical Company, at 290° F. (143.3° C.), at a chamber pressure of 40 psi (275.8 kPa), and a slurry rate of 3.5 ml/min with the steam valve open at 75% capacity.

The temperature of the starch solution was then decreased to 58° C. 5.0% of pullulanase (Promozyme, commercially available from Novo) by weight of starch was added and allowed to react for approximately 18 hours with constant mixing. Then 0.1% β-amylase (Spezyme BBA 1500, commercially available from Genencor) based on the weight of the starch was added and the reaction was allowed to proceed at 58° C. with constant mixing for approximately 2.5 hours until a dextrose equivalent of 32 and a viscosity of 14 sec at 25% solids and 22° C. using the funnel method. The enzymes were then deactivated by heating the dispersion to 95° C. and maintaining the elevated temperature for 30 minutes. The dispersion was then cooled to room temperature and spray dried using an inlet temperature of 200° C., an outlet temperature of 100° C. and a feed rate of 65 ml/min.

Example 3

Preparation of the Encapsulating Agent a) 300 g of sodium caseinate were dispersed in 2450 ml of distilled water at room temperature, using mechanical agitation at moderate speed. 300 g of modified starch of Example 2b were then added to the solution, and the mixture was agitated under moderate condition until smooth.
b) 200 g of soy protein isolate were dispersed in 2233 ml of distilled water at room temperature, using mechanical agitation at moderate speed, until no lumps were present. 200 g of modified starch of Example 2b were then added to the solution, and the mixture was agitated under moderate condition until smooth.
c) 300 g of soy protein isolate were dispersed in 3750 ml of distilled water at room temperature, using mechanical agitation at moderate speed, until no lumps were present. 300 g of modified starch of Example 2b were then added to the solution, and the mixture was agitated under moderate condition until smooth.

Example 4

Encapsulation of Fish Oil, Omega-3 Fatty Acid a) 200 g of fish oil were added to the matrix prepared in example 3a. The mixture was prehomogenized using a Barinco laboratory homogenizer. The solution was agitated at moderate speed for 2 minutes. This pre-emulsion was then homogenized using an APV homogenizer to reach a particle size of approximately 1 micron. The emulsion was spray-dried using a Niro Utility Spray Drier # 3-068 with a centrifugal atomizer installed. The inlet temperature was approximately 130° C. and the outlet temperature approximately 80° C. The flow rate was kept at about 50 ml/min.
b) 200 g of fish oil were added to the matrix prepared as in example 3b. The same homogenization and spray drying procedure described in example 4a was followed.
c) 600 g of fish oil and 2000 ppm of a natural antioxidant (mixed tocopherols) were added to the matrix prepared as in example 3c. The same homogenization and spray drying procedure described in example 4a was followed.

Example 5

Comparative Examples

To compare the process with existing art, Sample 4a was produced at elevated temperature, (60° C.). This sample had a higher degree of oxidation and lower sensory quality compared to the present low temperature treatment.

Example 6

Preparation of A Bread Product a) White Pan Bread

| Ingredient | Weight (g) |
| --- | --- |
| Flour - Patent | 600.00 |
| Sugar | 48.00 |
| Shortening | 30.00 |
| Salt | 12.00 |
| Dough conditioner | 6.00 |
| Yeast (instant) | 9.00 |
| Calcium propionate | 1.80 |
| Water | 378.00 |
| Encapsulated fish oil (example 4a) | 16.0 |
| Total | 1084.80 |

The ingredients were mixed in a Hobart mixer with dough hook at speed 1 for 2 minutes. The speed was then increased to speed 2 for until dough was developed (about 12 minutes). The dough was allowed to rest for five minutes. 510 grams of the dough were made into a round loaf and allowed to rest for an additional five minutes. The dough was placed in a pan and proofed at 37.8° C. (100° F.) and 80% relative humidity for 60 minutes. The bread was baked for 22 minutes at 215.6° C. (420° F.).

b) Example 6a was repeated using the encapsulated fish oil of Example 4b.
c) Example 6a was repeated using the encapsulated fish oil of Example 4c.

A panel of 8-10 trained panelists evaluated Examples 6a, 6b and 6c breads. The sensory test was performed on white bread containing 100 mg of EPA/DHA per a 50 g serving. All breads showed a better sensory profile when compared with breads produced using commercially available fish powders.

Example 7

Preparation of an Energy Bar

| Ingredient | % Formula |
| --- | --- |
| Concentrated soy protein | 7.8 |
| Protein drink powder-soy | 7.6 |
| Protein drink powder-whey | 7.6 |
| Corn Starch (HI-MAIZE ® 260 starch) | 8.4 |
| Nonfat dry milk (NFDM) | 8.7 |
| Peanut flour | 4.0 |
| Modified potato starch | 2.8 |
| Encapsulated fish oil (example 4c) | 2.1 |
| HFCS | 19.6 |
| Honey | 10.09 |
| Raisin Paste | 7.2 |
| Soy Oil | 2.8 |
| Glycerin | 1.2 |
| Oats-Quick oats | 6.2 |
| Soy Nuts | 3.7 |
| TOTAL | 100 |

The protein blends, HI-MAIZE® 260 starch, NFDM, peanut flour and potato starch were mixed at low speed for approximately 5 minutes until well blended. Mixing was continued while the liquid ingredients (HFCS, honey, raisin paste, soybean oil and glycerin) were added. The mixing was continued until uniform. The soy nuts were chopped using a coffee grinder. The oats and soy nuts were added and mixed at low speed until uniformly blended. The mixture was formed into desired size by extruding or pressing and enrobed in chocolate.

Sensory tests on the bar were positive and showed good acceptability of the product.

We claim:

1. A method of making a composition comprising
   a) mixing a protein and subsequently a modified starch in an aqueous medium at a temperature below that of the Maillard reaction to form an encapsulating mixture,
   b) adding an oxygen sensitive active agent to the encapsulating mixture to form a active agent/encapsulating mixture, and
   c) homogenizing the active agent/encapsulating mixture to form an emulsion, wherein the composition comprises the active agent encapsulated in the mixture comprising at least one modified starch and at least one protein, the modified starch comprising a starch derivative containing a hydrophobic group or both a hydrophobic and a hydrophilic group which has been degraded by an exo-enzyme and the protein selected from the group consisting of caseins and soy proteins.

2. The method of claim 1, further comprising drying the emulsion.

3. The composition produced by the method of claim 1.

4. A product comprising the composition of claim 3, wherein the product is selected from the group consisting of food products, pharmaceutical products, personal care products, hair care products, paper products, animal care products, and household products.

5. The product of claim 4, wherein the product is selected from the group consisting of cereal, powdered drink mix, instant coffee, instant tea, powdered sauce mix, powdered gravy mix, instant soup, powdered dressing, intermediate moisture foods and bakery product.

6. The composition produced by the method of claim 2.

7. A product comprising the composition of claim 6, wherein the product is selected from the group consisting of food products, pharmaceutical products, personal care products, hair care products, paper products, animal care products, and household products.

8. The product of claim 7, wherein the product is selected from the group consisting of cereal, powdered drink mix, instant coffee, instant tea, powdered sauce mix, powdered gravy mix, instant soup, powdered dressing, intermediate moisture foods and bakery product.

* * * * *